C. T. DICKEY.
METHOD OF MAKING TIRES.
APPLICATION FILED SEPT. 8, 1916.

1,325,465. Patented Dec. 16, 1919.

Inventor
Charles T. Dickey
By his Attorney

UNITED STATES PATENT OFFICE.

CHARLES T. DICKEY, OF ELIZABETH, NEW JERSEY, ASSIGNOR TO JOHN J. VOORHEES, JR., OF JERSEY CITY, NEW JERSEY.

METHOD OF MAKING TIRES.

1,325,465.     Specification of Letters Patent.     Patented Dec. 16, 1919.

Application filed September 8, 1916. Serial No. 119,143.

*To all whom it may concern:*

Be it known that I, CHARLES T. DICKEY, a citizen of the United States, residing at Elizabeth, in the county of Union and State of New Jersey, have invented certain new and useful Improvements in Methods of Making Tires, of which the following, taken in connection with the accompanying drawings, is a full, clear, and concise description thereof.

This invention relates to tires and the method of making the same, and particularly to pneumatic tubes adapted to be utilized in or as tires.

In the most common form of pneumatic tires, all of the tire is of a uniform thickness, and when inflated assumes a cylindrical shape. When a puncture occurs the portion perforated has a tendency to recede, thus enlarging the perforation. It has been attempted to obviate this difficulty by forming a thickened portion opposite the tread portion, and, in a more improved form of tire the thickened portion has been placed under compression by embedding therein thread members, and then turning the tire inside out. This latter type of tires, however, has their defect, in that the amount of compression obtained is more or less limited because the tire is cylindrically shaped in cross section, thus giving the radial planes comprising the thickened portion the same radii as other portions of the tire.

One of the objects of this invention is the production of a pneumatic tire capable of offering a very high resistance to puncture, and adapted to close or seal punctures.

Another object of the invention is the provision of a durable tire so constructed and transversely shaped that when inflated, the body portion adjacent the tread is greatly compressed, thereby being capable of resisting and automatically closing a puncture.

Another object of the invention is the provision of a tire having a conformation in which the axes are unequal, *i. e.*, having a major and a minor axis.

A still further object of the invention is the provision of a tire in which one of the structural features consisting in embedding a fabric member, inelastic transversely, in the rubber of the tire opposite the tread portion with the edges thereof adjacent the edges of the tread, and the intermediate portion assuming a curved or arcuate form, and preferably lying comparatively close to or exposed on the outside surface.

The nature of the means by which the foregoing and other more specific objects of the invention are accomplished will appear from the following detailed description.

Figure 1:
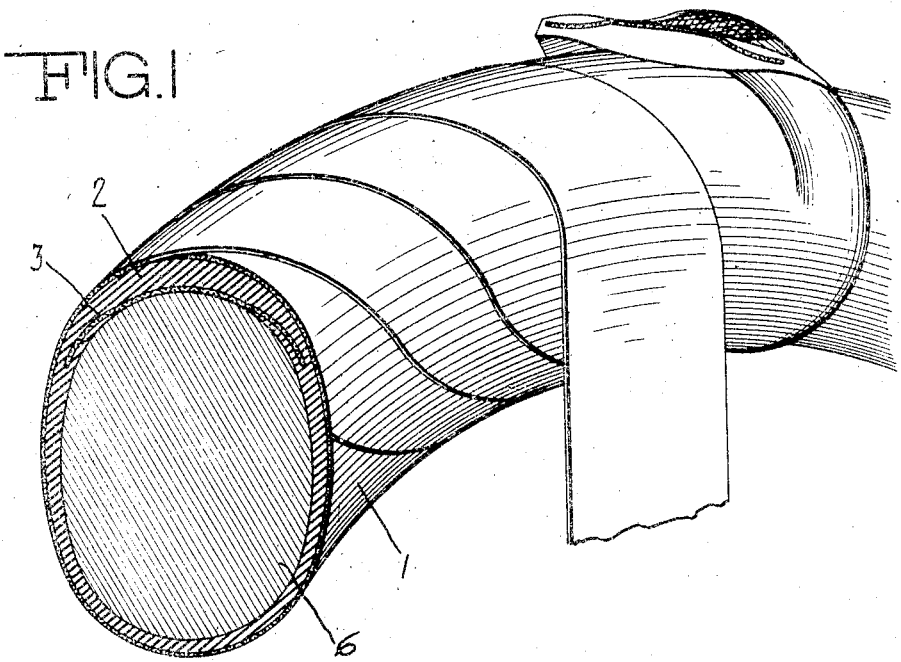
Figure 2:
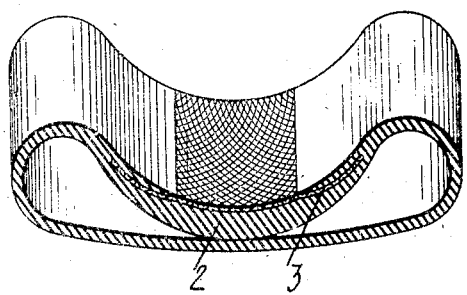
Figure 3:
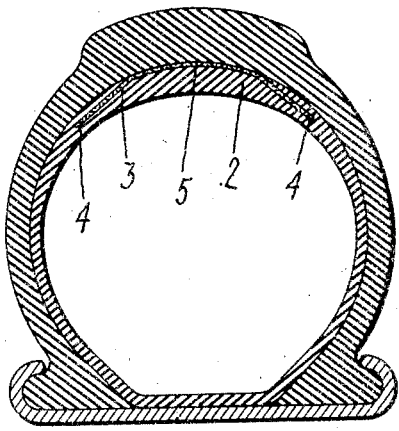

In the accompanying drawings, wherein similar reference characters refer to similar parts throughout the several views, Figure 1 is a perspective, partly in section, of a mandrel with a tire embodying the features of this invention formed thereon, with a portion of the tire stripped therefrom. Fig. 2 illustrates the tire or tube after reversal when stripped from the mandrel. Fig. 3 is a section of the article and associated parts when used as a tube.

The pneumatic tire contemplated by this invention is so constructed that when in use, a portion of the material composing the same is placed under great compression. This is effected by the special construction of the tire, which consists in forming a tire body upon a mandrel transversely shaped so as to have a major and a minor axis, such as an ellipse, building a thickened tread portion around one of the vertices, by vulcanizing successive layers of suitable material, such as rubber, to each other, embedding a transversely inelastic fabric member in said tread portion, preferably with a part thereof exposed, and removing the tire from the mandrel in a reversed condition.

Referring now more particularly to the drawings, the reference character 1 indicates a tire, or an inner tube which may form a part of a tire, of elastic material, such as rubber, a portion of this tube being thickened, as at 2, said thickened portion being disposed opposite the tread portion, which is formed around one of the vertices of the ellipse, and providing material for the coöperation of a fabric member hereinafter referred to, which fabric member is mainly employed for efficiently obtaining and retaining compression.

In the form illustrated in Fig. 2, a fabric member 3, has its ends 4 embedded in the rubber, with its intermediate portion 5 lying close to the outside surface, or preferably exposed. The fabric 3 is so woven that it is substantially inelastic transversely, but capable of slight extensibility longitudinally. By having a portion 5 exposed in the manner shown, upon the reversal and inflation of the tire, all of the tire body adjacent thereto is placed under great compression.

The tire is made by forming upon an elliptically-shaped mandrel 6 a tire body consisting of successive layers of rubber vulcanized to each other so as to comprise substantially an integral structure. The fabric member 3 is laid in such a position that its is adjacent one of the vertices of the mandrel 6, and its ends 4 become embedded in the rubber, while its central portion contacts with the mandrel 6, which causes this portion to be exposed when the tire is reversed, as clearly shown in Fig. 2. After placing the fabric member in position, additional layers of rubber are vulcanized around it in such a manner as to form a thickened portion, which is intended to comprise the tread of the tire. When the tire has been completely built, it is stripped from the mandrel, at the same time turning it inside out, as shown in Fig. 1. The tire, when not inflated, may assume a shape such as shown in Fig. 2. When it is inflated, as shown in Fig. 3, the fabric member 3 causes the material or rubber adjacent thereto to be placed under great compression on the inside, thus being capable of offering great resistance to puncture and automatically sealing a puncture which may occur.

From the above description it will be apparent that by constructing the tread portion of the tire with smaller radii than the main body portion, greater compression results when the tire is inflated than would be obtained if the whole tire had substantially the same radii, as would be the case if cylindrically shaped transversely.

It is also obvious that the radial plane occupied by the fabric member is quite a determining factor in producing a given compression, since it is inelastic transversely, and the greater the mass of rubber underneath, or opposite thereto, the greater the compression. In other words, if the fabric was centrally located transversely in the thickened portion of the tire, the compression obtained upon inflation would not be as great as that obtained when the intermediate portion of the fabric is exposed in the manner illustrated.

While I have described my invention with reference to the specific embodiment shown, it is obvious that various changes in detail may be made without departing from the spirit and scope of my invention, as defined by the following claims.

Having thus described my invention, what I claim as new herein and desire to secure by Letters Patent is:—

1. The method of making a pneumatic tire which consists in forming a tire body upon a mandrel transversely elliptically shaped, building a thickened tread portion by vulcanizing successive layers of rubber to each other, embedding a transversely inelastic fabric member in said tread portion in a manner so as to bring its edges near the surface of said tread portion with its intermediate portion describing a curve having a different radial length than that of the tread portion, and turning said tire inside out when removing it from said mandrel.

2. A step in the method of making a pneumatic tire, which consists in forming a tire body upon a mandrel transversely elliptically shaped, and building a thickened tread portion about one of the vertices thereof and turning said tire inside out and removing it from the mandrel.

3. A step in the method of making a pneumatic tire, which consists in forming a tire body upon a mandrel transversely elliptically shaped, building a thickened tread portion about one of the vertices thereof, and embedding a transversely inelastic fabric member in said tread portion in a manner so that the plane occupied by the said fabric is eccentric to the radial planes occupied by the material forming said thickened portion and in stripping the tire from the mandrel.

4. A step in the method of building a pneumatic tire consisting in forming a tire body upon a mandrel of elliptical formation and materially increasing the thickness of the tread portion of the tire about one of the relatively narrow vertices of the mandrel and in turning said tire inside out, when removing it from the mandrel.

5. A step in the method of building a pneumatic tire consisting in forming a tire body upon a mandrel of elliptical formation and materially increasing the thickness of the tread portion of the tire about one of the relatively narrow vertices of the mandrel, and embedding in the thickened tread portion of the tire a tread compressing member and in turning said tire inside out, when removing it from the mandrel.

6. A step in the method of making a pneumatic tire which consists in forming a tire body upon a curved surface mandrel having major and minor diameters, and increasing the thickness of the tread portion of the tire about one of the relatively narrow portions of the mandrel, and removing the tire from the mandrel.

CHARLES T. DICKEY.